United States Patent [19]

Gustafson

[11] 4,285,918
[45] Aug. 25, 1981

[54] REGENERATIVE $CO_2$ ABSORBENT
[75] Inventor: Paul R. Gustafson, Oxon Hill, Md.
[73] Assignee: The United States of America as represented by the Secretary of the Navy, Washington, D.C.
[21] Appl. No.: 124,204
[22] Filed: Feb. 25, 1980
[51] Int. Cl.$^3$ .............................................. B01D 53/34
[52] U.S. Cl. ..................................... 423/228; 423/226
[58] Field of Search .............. 423/226, 228, 229, 243; 55/68, 73; 260/584 R

[56] References Cited
U.S. PATENT DOCUMENTS

| | | | |
|---|---|---|---|
| 2,174,242 | 9/1939 | Haas et al. ............................ | 260/584 |
| 3,387,917 | 6/1968 | Walles et al. ......................... | 423/226 |
| 3,502,428 | 3/1970 | Gelbein et al. ....................... | 423/239 |
| 3,632,519 | 1/1972 | Gustafson ........................ | 423/226 X |

OTHER PUBLICATIONS

Sowden et al., "$f$-Glycidol", Journal of the American Chemical Society, vol. 64, Jun. 1942, pp. 1291–1293.

Primary Examiner—Earl C. Thomas
Attorney, Agent, or Firm—R. S. Sciascia; A. L. Branning; T. E. McDonnell

[57] ABSTRACT

Acid gases, such as $CO_2$, can be extracted from a gaseous feed stream by contacting the exhausted inlet gas with an aqueous solution of 3-amino-1,2 propanediol, separating the regenerated feed stream from the aqueous amine solution and the acid gases dissolved therein, and further separating these dissolved acid constituents from the diol solution; finally, repeating the above cycle indefinitely.

1 Claim, No Drawings

REGENERATIVE CO₂ ABSORBENT

BACKGROUND OF THE INVENTION

This invention relates to a method for removing acid gases from gaseous streams and, more particularly, to a process for removing $CO_2$ and other acid gas constituents from the atmosphere by contacting the ambient air with an aqueous solution of 3-amino-1,2 propanediol of sufficient strength to purify it for rebreathing.

There is currently a great need for an improved method of regenerating breathing air, as well as other gas streams, from acid impurities. Such a method has several diverse applications, e.g., for air purification in submarines and other closed systems, scrubbing coke oven gases free of sulfur contaminants, and purification of feed-gas streams for many diverse utilities. The active solvent composition of the present invention is useful for removing acid gases, using methods already well known in the art.

A particular need of the Navy has been an improved absorber solution for removing $CO_2$ from impure air in air purification systems. Currently, such systems are restricted by the use of monoethanolamine (MEA) as the regenerative $CO_2$ absorbent. MEA solutions used for $CO_2$ removal in submarine systems have several serious defects, such as (1) low regeneration efficiency, (2) evolution of ammonia, $NH_3$, (3) high volatility, (4) toxicity and (5) lack of stability to oxidation under these operating conditions.

There have been several attempts at producing improved processes for the extraction of $CO_2$ and other acid gases from gas streams. U.S. Pat. No. 3,632,519 deals with an earlier attempt to solve the problem of improved $CO_2$ removal in submarine scrubber systems, and employs aminoalkyl alkylsulfones, not amino diols, as the regenerative cleaner. U.S. Pat. No. 3,502,428 employs a solution comprising several dialkanolamines together with a dioxo heterocyclic as the active purification agent. U.S. Pat. No. 3,387,917 discloses the removal of $CO_2$ using a composition comprising a solution of a 3-morpholinone compound and an alkanolamine. However, an amino diol has not been suggested as a basic element in any atmosphereregenerative cleaning process to date.

SUMMARY OF THE INVENTION

The present invention relates to an improved aqueous solution for use in the scrubbers of a regenerative system for absorption of acid gases, particularly $CO_2$, from an inlet gas feed stream, such as exhausted air. The active ingredient in the solution is 3-amino-1,2 propanediol, which allows a greater amount of acid gas to be rapidly absorbed, and is more efficient, while being less toxic.

An object of this invention is improve the solvent composition for the removal of impurities from gas streams.

Another object of this invention is to replace monoethanolamine as a regenerative $CO_2$ absorbent in a submarine scrubber.

Other objects, advantages and novel features of the invention will become apparent from the following detailed description of the invention.

DESCRIPTION OF THE PREFERRED EMBODIMENT

The usage of this invention is directed towards the purification of the atmosphere aboard submarines, where an aqueous solution of monoethanolamine (MEA) is currently used in the scrubbers for absorption of carbon dioxide from the ambient air. U.S. Pat. No. 3,372,987 describes a well-known stripper used on nuclear submarines, and is directed to an MEA solution to which an additive has been added to overcome the problem of oxidative breakdown of the MEA solutions due to trace amounts of metal impurities. This invention can be utilized in the same well-known scrubber; therefore, the scrubber will not be fully described herein.

The scrubber comprises an absorber section having a tower which contains an aqueous solution of the absorbent, e.g., MEA, and a regeneration section for driving out the $CO_2$ from the spent absorbing solution and cooling the stripped solution prior to recycling it in the absorption section. The atmosphere aboard the submarine is pumped through the absorption tower and the resulting solution containing the formed amine carbonate is processed to cause the release of $CO_2$ therefrom. The regenerated MEA solution is cooled and returned to the absorber section for further removal of $CO_2$ from the atmosphere of the submarine. The process of absorption, stripping, cooling and recycling is continued until the $CO_2$ level is reduced to an acceptable level, e.g., 1% volume.

3-amino-1,2 propanediol, $CH_2HCHOHCH_2NH_2$ (APD) has an ability to rapidly absorb $CO_2$, as well as other acid gases. The diol can be prepared by the methods illustrated in the article "$f$-Glycidol" by J. C. Sowden et al; Journal of the American Chemical Society, Vol. 64, pp. 1291-1293, using 1-Amino-acetone-propanediol-2,3, or $f$-Glycidol as starting materials. In the practice of the invention, an aqueous solution of APD, the concentration not being critical, was substituted for the MEA solution in the aqueous solutions of the submarine scrubbers. The results were excellent, showing an improved $CO_2$ scrubbing effectiveness, lower $CO_2$ desorption, lower volatility and no evolution of $NH_3$ gas.

Although applicant does not wish to be bound by any theory, it is believed that APD, by virtue of its additional hydroxyl group, should react more readily with dissolved $CO_2$ than MEA because of increased hydrogen bonding. Due to the alpha hydroxyl group, the stripping efficiency will be greater, leading to a reduction in amine breakdown, compared with that of MEA. The volatility of APD is less than MEA, due to its high boiling point (264–265° C.).

Thus, APD exhibits superior results as a regenerative $CO_2$ absorbent in aqueous solutions when used in the scrubbers of a regenerative system for absorption of $CO_2$ and other acid gases from the atmosphere of a submarine or any other confined environment.

This invention further comprises a novel process for the extraction of $CO_2$ and other acid gases from gas streams, comprising the steps of creating an aqueous solution of 3-amino-1,2 propanediol; contacting the acid gas stream with the APD solution; separating the gas stream from the exhausted APD solution, and regenerating the APD solution by removing the $CO_2$ and other acidic constituents from the aqueous solution, and repeating the above sequence of steps indefinitely.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A process for the extraction of $CO_2$ from the breathing air of a submarine comprising:

creating an effective amount of an aqueous solution of 3-amino-1,2-propanediol;

contacting the exhausted breathing air with the aqueous solution in order to extract $CO_2$ from the air;

separating the regenerated air from the aqueous solution and the $CO_2$ gases dissolved therein;

separating the dissolved $CO_2$ gas constituents from the aqueous solution, thereby producing a regenerated aqueous solution;

reusing the regenerated aqueous solution for the removal of additional $CO_2$ by continually repeating the above cycle.

* * * * *